US008464035B2

(12) United States Patent
Dixon et al.

(10) Patent No.: US 8,464,035 B2
(45) Date of Patent: Jun. 11, 2013

(54) INSTRUCTION FOR ENABLING A PROCESSOR WAIT STATE

(75) Inventors: Martin G. Dixon, Portland, OR (US); Scott D. Rodgers, Hillsboro, OR (US); Taraneh Bahrami, San Jose, CA (US); Stephen H. Gunther, Beaverton, OR (US); Prashant Sethi, Folsom, CA (US); Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 12/641,534

(22) Filed: Dec. 18, 2009

(65) Prior Publication Data

US 2011/0154079 A1     Jun. 23, 2011

(51) Int. Cl.
*G06F 1/32* (2006.01)
*G06F 12/08* (2006.01)
*G06F 9/30* (2006.01)

(52) U.S. Cl.
USPC .................................. 713/1; 713/2; 713/100

(58) Field of Classification Search
USPC ................................................ 713/1, 2, 100
See application file for complete search history.

(56) References Cited

U.S. PATENT DOCUMENTS

| 7,363,474 | B2 | 4/2008 | Rodgers et al. | |
|---|---|---|---|---|
| 8,156,275 | B2 * | 4/2012 | de Cesare et al. | 710/200 |
| 2003/0126375 | A1 | 7/2003 | Hill et al. | |
| 2006/0150183 | A1 | 7/2006 | Chinya et al. | |
| 2006/0150184 | A1 | 7/2006 | Hankins et al. | |
| 2006/0271932 | A1 | 11/2006 | Chinya et al. | |
| 2006/0282839 | A1 | 12/2006 | Hankins et al. | |
| 2006/0294326 | A1 | 12/2006 | Jacobson et al. | |
| 2007/0006231 | A1 | 1/2007 | Wang et al. | |
| 2007/0079301 | A1 | 4/2007 | Chinya et al. | |
| 2007/0220294 | A1 | 9/2007 | Lippett | |
| 2009/0172284 | A1 | 7/2009 | Offen | |
| 2009/0235105 | A1 | 9/2009 | Branover et al. | |

OTHER PUBLICATIONS

Intel, "Intel 64 and IA-32 Architectures Software Developer's Manual, vol. 2A: Instruction Set Reference, A-M," Sep. 2009, pp. 3-638-3-640 (Monitor), 3-762-3-765 (MWAIT).
Intel, "IA-32 Intel Architecture Software Developer's Manual, vol. 3: System Programming Guide," 2004, Chapter 7, Multiple-Processor Management, pp. 7-1-7-46.
Patent Cooperation Treaty, Notification of Transmittal of the International Search Report and the Written Opinion of the International Searching Authority mailed Jun. 27, 2011 in international application No. PCT/US2010/056320.
Nikos Anastopoulos, et al., "Facilitating Efficient Synchronization of Asymmetric Threads on Hyper-Threaded Processors," 2008, pp. 1-8.

* cited by examiner

*Primary Examiner* — M Elamin
(74) *Attorney, Agent, or Firm* — Trop, Pruner & Hu, P.C.

(57) ABSTRACT

In one embodiment, the present invention includes a processor having a core with decode logic to decode an instruction prescribing an identification of a location to be monitored and a timer value, and a timer coupled to the decode logic to perform a count with respect to the timer value. The processor may further include a power management unit coupled to the core to determine a type of a low power state based at least in part on the timer value and cause the processor to enter the low power state responsive to the determination. Other embodiments are described and claimed.

24 Claims, 7 Drawing Sheets

INSTRUCTION FOR ENABLING A PROCESSOR WAIT STATE

BACKGROUND

As processor technologies evolve, processors are becoming available with greater amounts of cores. To efficiently execute software, these cores may be tasked to perform different threads of a single application. Such an arrangement is referred to as cooperative threaded software. In modern cooperative threaded software, it is common for one thread to be waiting for another thread to complete. Conventionally, the processor on which the waiting thread is running burns active power while waiting. Still further, the time for waiting may be indeterminate, and thus the processor may not know for how long it should wait.

Another mechanism to enable a core to wait is to place the core into a wait state such as a low power state. To implement this task, an operating system (OS) is invoked. The OS may execute a pair of instructions referred to as a MONITOR instruction and an MWAIT instruction. Note that these instructions are not available to application level software. Instead, these instructions are used solely at the OS privilege level to set up an address range for monitoring and to enable the processor to enter into a low power state until the address range that is monitored is updated. However, there is significant overhead in entering into the OS to perform these instructions. This overhead is in the form of a high latency and furthermore can raise complexity, as OS scheduling issues may result in the waiting thread not being the next scheduled thread when it exits the wait state.

DETAILED DESCRIPTION

Figure 1:
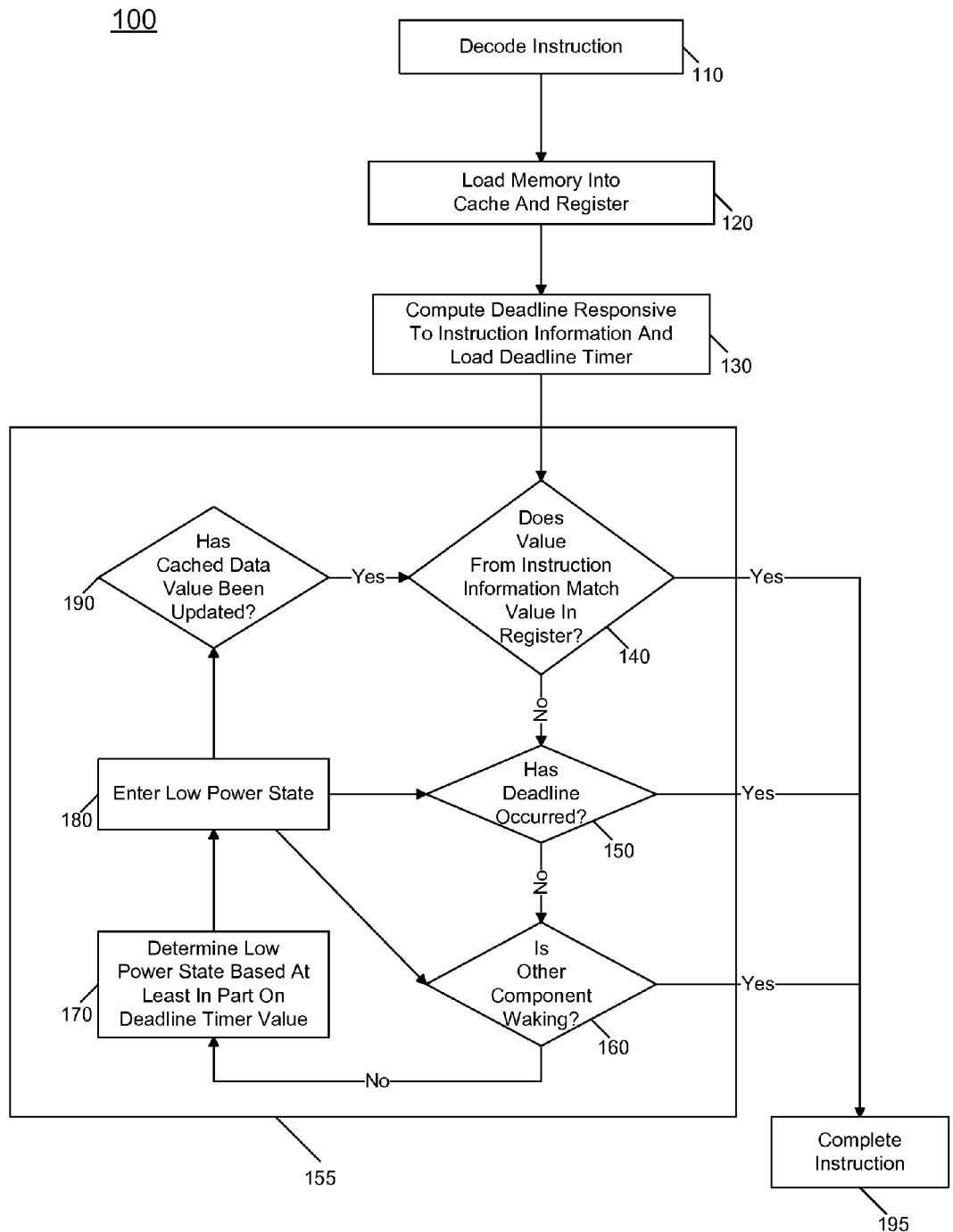
FIG. 1 is a flow diagram of a method in accordance with one embodiment of the present invention.

In various embodiments, a user-level instruction (that is, an application-level instruction) may be provided and used to allow an application to wait for one or more conditions to occur. While the application is waiting, a processor on which the application is executing (e.g., a core of a multi-core processor) may be placed in a low power state or may switch to execute another thread. Although the scope of the present invention is not limited in this regard, the conditions on which the processor may wait can include detection of a value, timeout of a timer, or receipt of an interrupt signal, e.g. from another processor.

In this way, an application can wait on one or more operations occurring, e.g., in another thread without the need to yield to an operating system (OS) or other supervisor software. Still further, based on instruction information provided with the instruction, this wait state may occur in a time-bounded fashion so that the processor can select an appropriate low power state to enter. That is, control logic of the processor itself may determine based on the instruction information provided and various calculations performed in the processor, an appropriate low power state to enter. As a result, the overhead of incurring OS involvement to enter into a low power state can be avoided. Note that the processor need not be waiting for another peer processor, but could be waiting for a co-processor such as a floating point co-processor or other fixed function device.

In various embodiments, a user-level instruction may have various information associated with it, including a location to monitor, a value to look for, and a time-out value. While the scope of the present invention is not limited in this regard, for ease of discussion this user-level instruction may be called a processor wait instruction. Different flavors of such user-level instruction may be provided, each of which may indicate, e.g., waiting for a specific value, set of values, range, or coupling the wait along with an operation, e.g., incrementing a counter upon the value becoming true.

In general, a processor may cause various actions to occur responsive to a processor wait instruction, which may include or be associated with the following instruction information: a source field, which indicates the location of a value to be tested; a timeout or deadline timer value, which indicates a point at which the wait state should end (if the value to be tested for is not achieved); and a result field, which indicates the value that is to be attained. In other applications, in addition to these fields, a destination or mask field may be present in an implementation in which the source value is masked and tested against a predetermined value (e.g. whether or not the masked value of the result of the mask is non-zero).

As mentioned above, the processor may execute various operations responsive to this instruction. In general, these operations may include: testing whether a value of the monitored location is at a target value (e.g., performing a Boolean operation to test for a "true" condition); and testing whether the deadline timer value has been reached. If either of these conditions is met (e.g., true) or if an interrupt is received from another entity, the instruction may be completed. Otherwise, a mechanism may be initiated to monitor the location to see if the value will change. Accordingly at this time, a wait state may be entered. In this wait state, the processor may enter a low power state or may cause initiation of execution of another processor hardware thread. If a low power state is desired, the processor may select an appropriate low power state based at least in part on the amount of time remaining until the deadline timer is reached. Then the low power state may be entered, and the processor may remain in this state until awoken by one of the conditions discussed above. While described with this general operation, understand that in different implementations various features and operations can occur differently.

Referring now to FIG. 1, shown is a flow diagram of a method in accordance with one embodiment of the present invention. As shown in FIG. 1, method 100 may be implemented by a processor executing a user-level instruction for handling a processor wait operation. As seen, method 100 may begin by decoding a received instruction (block 110). As one example, the instruction may be a user-level instruction that is provided by an application, e.g. an application that is implemented using multiple threads each including instructions that may have some interdependence in the execution of a cooperative threaded application. After decoding of the instruction, the processor may load a memory value into a cache and a register (block 120). More specifically, a source operand of the instruction may identify a location, e.g., in memory at which a value is to be obtained. This value may be loaded into a cache memory, e.g., a low level cache associated with the core that is executing the instruction, such as a private cache. Still further, the value may be stored into a register of the core. As one example, this register may be a general-purpose register of a logical processor of the thread. Next, control passes to block 130. At block 130 a deadline may be computed responsive to the instruction information. More specifically, this deadline may be an amount of time for which the wait state should occur if a condition is not met (e.g., a desired value is not updated). In one embodiment, the instruction format may include information that provides a deadline timer value. To determine the appropriate time until this deadline is reached, in some implementations the deadline timer value received may be compared to a current time counter value present in the processor, e.g., a timestamp counter (TSC) value. This difference may be loaded into a deadline timer, which may be implemented using a counter or register in some embodiments. This deadline timer may be, in one embodiment a countdown timer that begins counting down. In this implementation, the deadline is subtracted from the current TSC value, and the countdown timer ticks for that many cycles. When the TSC value exceeds the deadline, it triggers resumption of the processor. That is, as will be discussed below, when the deadline timer is decremented to zero, the wait state may be terminated, if it is still ongoing at that time. In a register implementation, a comparator can compare the value of the TSC counter to the deadline every cycle.

The above operations thus properly set up various structures to be accessed and tested during the wait state. Accordingly, a wait state may be entered. This wait state may generally be part of a loop 155 that may be iteratively executed until one of multiple conditions occurs. As seen, it may be determined whether a target value from the instruction information matches the value stored in the register (diamond 140). In an implementation in which the instruction information includes the target value, the data that is obtained from memory and stored in the register may be tested to determine whether its value matches this target value. If so, the condition has been met, and control passes to block 195, where execution of the wait instruction may be completed. This completion of the instruction may additionally cause the setting of various flags or other values, to enable an indication to following code of the reason for exiting the wait state. Once the instruction is completed, operation of the thread that requested the wait state may continue.

If instead at diamond 140 it is determined that the condition has not been met, control passes to diamond 150 where it may be determined whether the deadline has occurred. If so, the instruction may complete as discussed above. Otherwise control passes to diamond 160 where it may be determined whether another hardware component is seeking to wake up the processor. If so the instruction completes as discussed above. Otherwise, control passes to block 170, where a low power state may be determined based at least in part on the deadline timer value. That is, the processor may itself and without OS involvement determine an appropriate low power state based on an amount of remaining time before the deadline is to occur. To realize this determination in some embodiments logic, e.g., of an uncore of a processor may be used. This logic may include or may be associated with a table that associates various low power states and deadline timer values, as will be discussed below. Based on this determination of block 170, the processor may enter a low power state (block 180). In the low power state, various structures of the processor, both of a core on which the instructions are executing as well as other components can be placed in a low power state. The specific structures to be placed in a low power state and the level of the low power state may vary depending on implementation. Note that if the loop is traversed because an updated value is not the target value, a determination of a new low power state may be performed based on updated deadline timer value, as it may not be appropriate to enter into a certain low power state (e.g., a deep sleep state) if only a limited amount of time is left.

Various events may occur that cause the core to exit the low power state. Notably, the low power state may be executed if cached data (i.e., corresponding to the monitored location) has been updated (diamond 190). If so, control passes back to diamond 140. Similarly, if the deadline passes and/or a wake signal is received from another hardware component, control may pass from the low power state to one of diamonds 150 and 160. While shown with his high-level implementation in the embodiment of FIG. 1, understand the scope of the present invention is not limited in this regard.

In other implementations, a mask-based test for a target value may occur. That is, the user-level instruction may implicitly indicate a target value to be attained. As one example, this target value may be a non-zero value of a mask operation between a source value obtained from memory and a mask value present in a source/destination operand of the instruction. In one embodiment, the user-level instruction may be a load, mask, wait if zero (LDMWZ) instruction of a processor ISA. The instruction may take the format of LDMWZ r32/64, M32/64, in one embodiment. In this format, the first operand (r32/64) may store a mask and the second operand (M32/64) may identify a source value (i.e., the monitored location). In turn, a time out value may be stored in a third register. For example, the deadline may be in implicit registers. In particular, the EDX:EAX registers may be used, which is the same set of registers that are written when the TSC counter is read. In general, the instruction may perform non-busy polling of a semaphore value, and enter a low power wait state if the semaphore is not available. In different implementations, both bit-wise semaphores and counting semaphores can be handled, where zero indicates nothing is waiting. The timeout value may indicate the amount of time, measured in TSC cycles that the processor should wait on a non-zero result before unconditionally resuming operation. In one embodiment, software can be provided information as to which physical processors are in a low power state via a memory mapped register (e.g., a configuration and status register (CSR)).

In this embodiment, the LDMWZ instruction will load data from the source memory location, mask it with the source/destination value, and test to see whether the resulting value is zero. If the masked value is not zero, the value loaded from memory will be placed in the source/destination register unmasked. Otherwise, the processor will enter a low power waiting state. Note that this low power state may or may not correspond to a currently defined low power state such as a so-called C-state according to an Advanced Configuration and Power Interface (ACPI) Specification ver. 4 (Jun. 16, 2009). The processor may remain in the low power state until such time that either the specified time interval elapses, an external exception is signaled (e.g., a generic interrupt (INTR), non-maskable interrupt (NMI), or a system management interrupt (SMI)) or the source memory location is written with a value that when masked is non-zero. As part of entering this wait state, the processor may clear a memory mapped register (CSR) bit indicating that the processor is currently waiting.

Upon exiting from the wait state due to the monitored location being written with a value that when masked produces a non-zero value, a zero value indicator of a flag register may be cleared and the unmasked value read can be placed in the destination register. Should timer expiration cause the exit from the low power state, the zero value indicator of the flag register may be set to allow software to detect such condition. Should exit occur due to an external exception, the state of the processor and of memory can be such that the instruction will not be considered to have executed. As such, upon returning to the normal execution flow, the same LDMWZ instruction will be re-executed.

Figure 2:
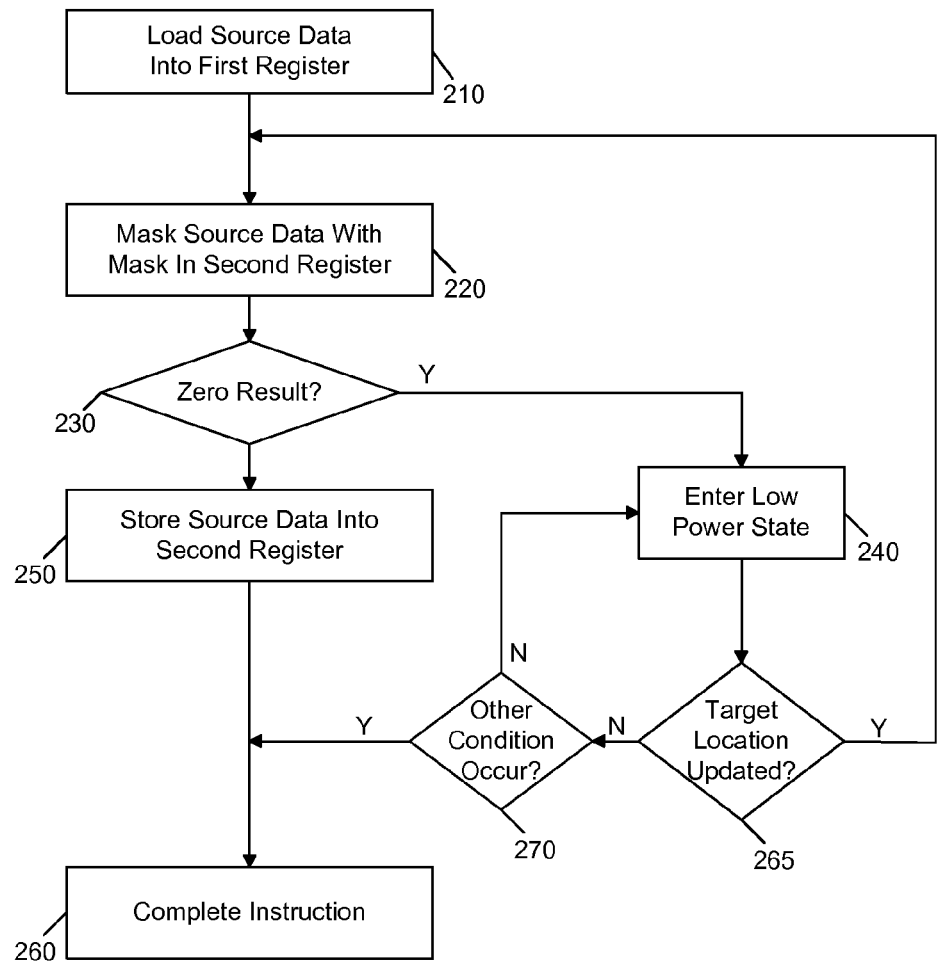
FIG. 2 is flow diagram of a test for a target value that can be performed according to one embodiment of the present invention.

Referring now to FIG. 2, shown is flow diagram of a test for a target value that can be performed according to another embodiment of the present invention. As shown in FIG. 2, method 200 may begin by loading source data into a first register (block 210). This source data may be masked with a mask present in a second register (block 220). In various embodiments, the first and second registers may be prescribed by an instruction and may correspond to the location for storage of the source data and destination data, respectively. It may then be determined whether the result of the mask operation is zero (diamond 230). If so, the desired condition has not been met and the processor may enter a low power state (block 240). Otherwise, the source data may be stored into the second register (block 250), and instruction execution completed (block 260).

During the wait state, the target location is updated as determined at diamond 265, control passes back to block 220 to perform the mask operation. If another condition is determined to have occurred during the wait state (as determined at diamond 270), control passes to block 260 for completion of the instruction. While shown with this particular implementation in the embodiment of FIG. 2, the scope of the present invention is not limited in this regard.

Figure 3:
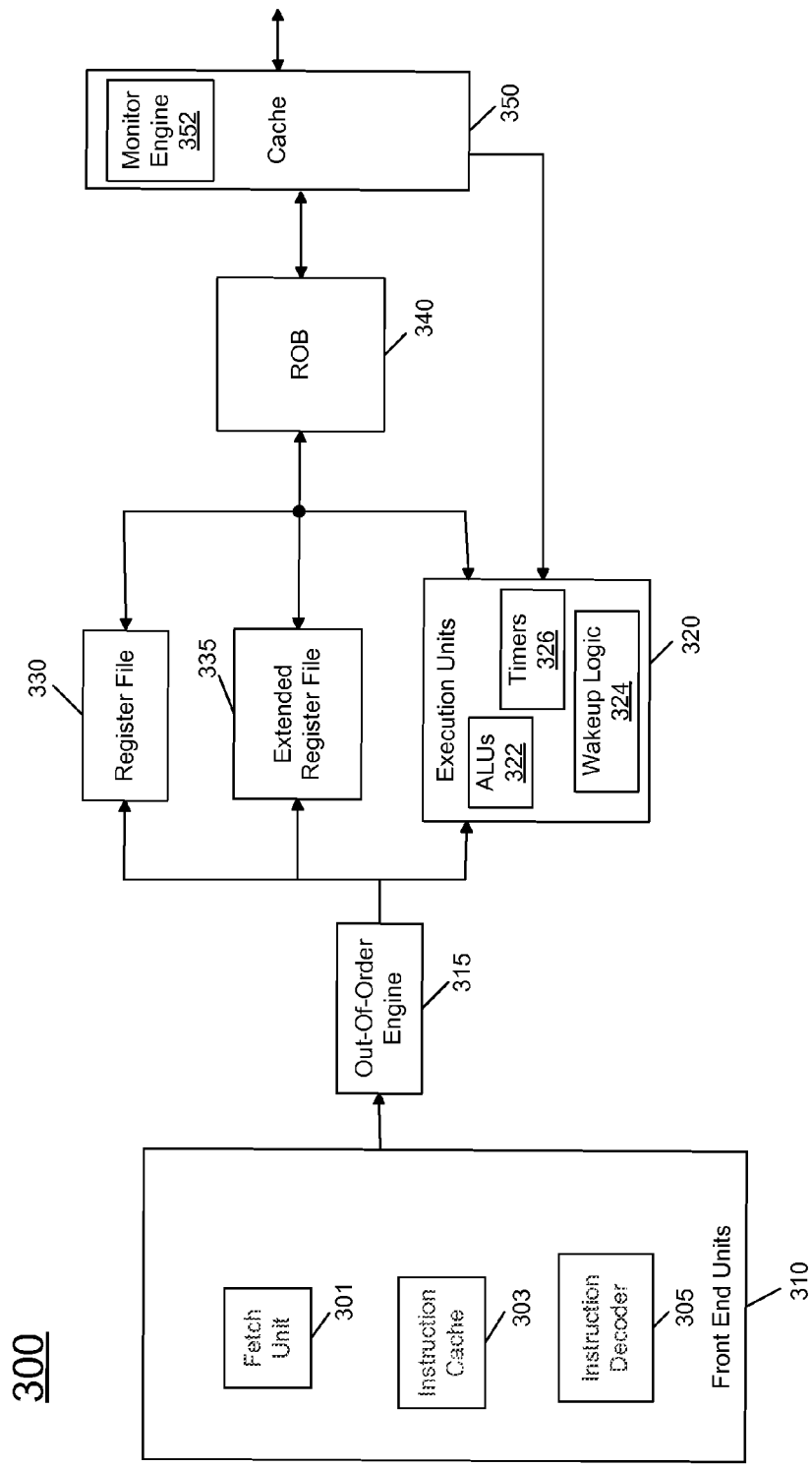
FIG. 3 is a block diagram of a processor core in accordance with one embodiment of the present invention.

Referring now to FIG. 3, shown is a block diagram of a processor core in accordance with one embodiment of the present invention. As shown in FIG. 3, processor core 300 may be a multi-stage pipelined out-of-order processor. Processor core 300 is shown with a relatively simplified view in FIG. 3 to illustrate various features used in connection with processor wait states in accordance with an embodiment of the present invention.

As shown in FIG. 3, core 300 includes front end units 310, which may be used to fetch instructions to be executed and prepare them for use later in the processor. For example, front end units 310 may include a fetch unit 301, an instruction cache 303, and an instruction decoder 305. In some implementations, front end units 310 may further include a trace cache, along with microcode storage as well as a micro-operation storage. Fetch unit 301 may fetch macro-instructions, e.g., from memory or instruction cache 303, and feed them to instruction decoder 305 to decode them into primitives, i.e., micro-operations for execution by the processor. One such instruction to be handled in front end units 310 may be a user-level processor wait instruction in accordance with an embodiment of the present invention. This instruction may enable the front end units to access various micro-operations to enable execution of the operations such as described above associated with the wait instruction.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335. Register file 330 may include separate register files for integer and floating point operations. Extended register file 335 may provide storage for vector-sized units, e.g., 256 or 512 bits per register.

Various resources may be present in execution units 320, including, for example, various integer, floating point, and single instruction multiple data (SIMD) logic units, among other specialized hardware. For example, such execution units may include one or more arithmetic logic units (ALUs) 322. In addition, a wakeup logic 324 in accordance with an embodiment of the present invention may be present. Such wakeup logic may be used to execute certain of the operations involved in performing a processor wait mode responsive to a user-level instruction. As will be discussed further below, additional logic for handling such wait states may be present in another part of a processor, such as an uncore. Also shown in FIG. 3 is a set of timers 326. Relevant timers for analysis here include a TSC timer, as well as a deadline timer that can be set with a value corresponding to a deadline before which the processor will leave the wait state if no other condition has been met. Wakeup logic 324 may activate certain operations when the deadline timer reaches a predetermined count value (which may be a count down to zero, in some embodiments). Results may be provided to retirement logic, namely a reorder buffer (ROB) 340. More specifically, ROB 340 may include various arrays and logic to receive information associated with instructions that are executed. This information is then examined by ROB 340 to determine whether the instructions can be validly retired and result data committed to the architectural state of the processor, or whether one or more exceptions occurred that prevent a proper retirement of the instructions. Of course, ROB 340 may handle other operations associated with retirement. In the context of a processor wait instruction in accordance with an embodiment of the present invention, retirement may cause ROB 340 to set a state of one or more indicators of a flag register or other status registers, which can indicate a reason that a processor exited a wait state.

As shown in FIG. 3, ROB 340 is coupled to a cache 350 which, in one embodiment may be a low level cache (e.g., an L1 cache) although the scope of the present invention is not limited in this regard. Also, execution units 320 can be directly coupled to cache 350. As seen, cache 350 includes a monitor engine 352, which may be configured to monitor a particular cache line, namely a monitored location and to provide a feedback to wakeup logic 324 (and/or to uncore components) when the value is updated, a change in the cache coherency state of the line occurs, and/or the line is lost. Monitor engine 352 acquires a given line and holds it in the shared state. It will initiate a wake up of the processor if it ever loses the line from the shared state. From cache 350, data communication may occur with higher level caches, system memory and so forth. While shown with this high level in the embodiment of FIG. 3, understand the scope of the present invention is not limited in this regard.

Figure 4:
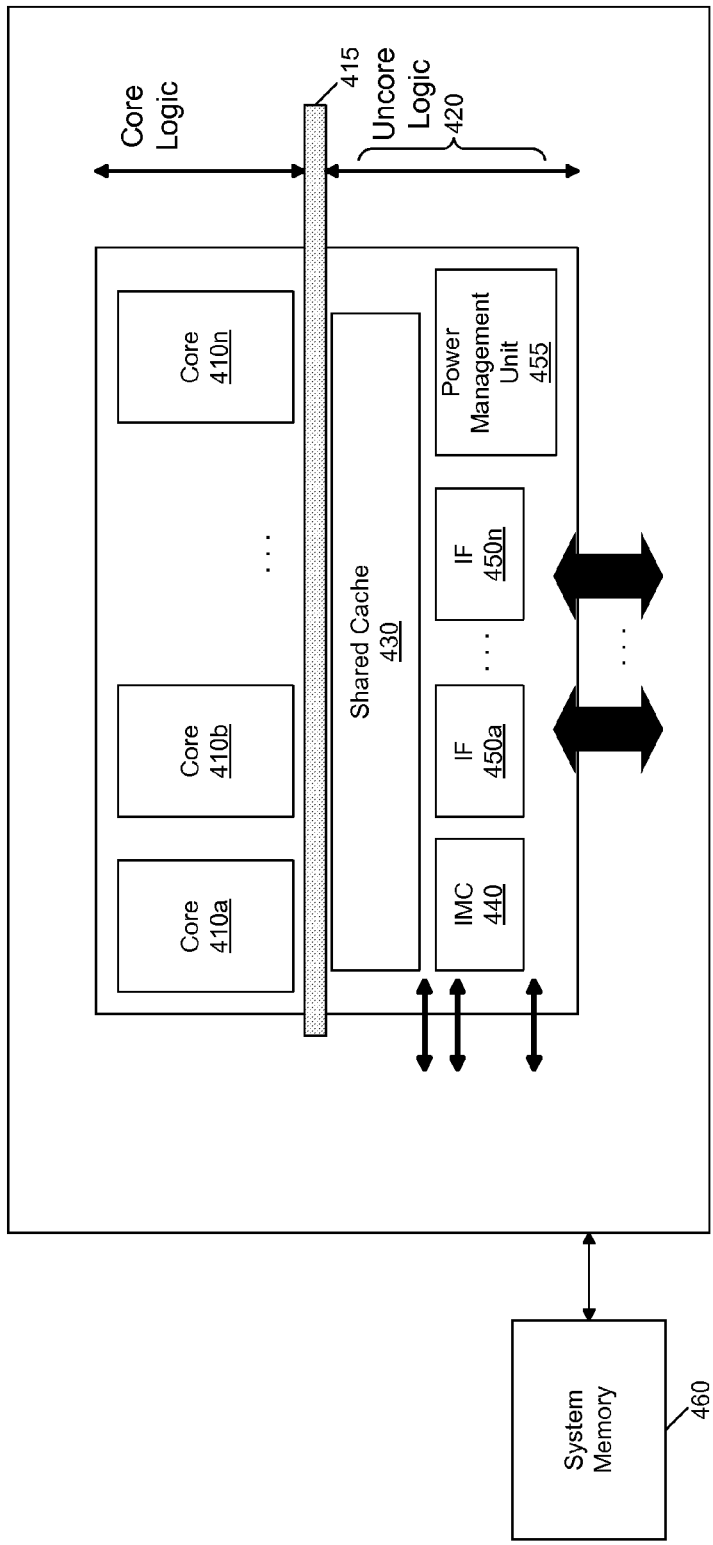
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may be configured as core 300 described above with regard to FIG. 3. The various cores may be coupled via an interconnect 415 to an uncore 420 that includes various components. As seen, the uncore 420 may include a shared cache 430 which may be a last level cache. In addition, the uncore may include an integrated memory controller 440, various interfaces 450 and a power management unit 455. In various embodiments, at least some of the functionality associated with executing a processor wait instruction may be implemented in power management unit 455. For example, based on information received with the instruction, e.g., the deadline timer value, power management unit 455 may determine an appropriate low power state in which to place a given core that is executing the wait instruction. In one embodiment, power management unit 455 may include a table that associates timer values with a low power state. Unit 455 may look up this table based on the determined deadline value associated with an instruction and select the corresponding wait state. In turn, power management unit 455 may generate a plurality of control signals to cause various components, both of a given core as well as other processor units to enter into a low power state. As seen, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

In other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 5:
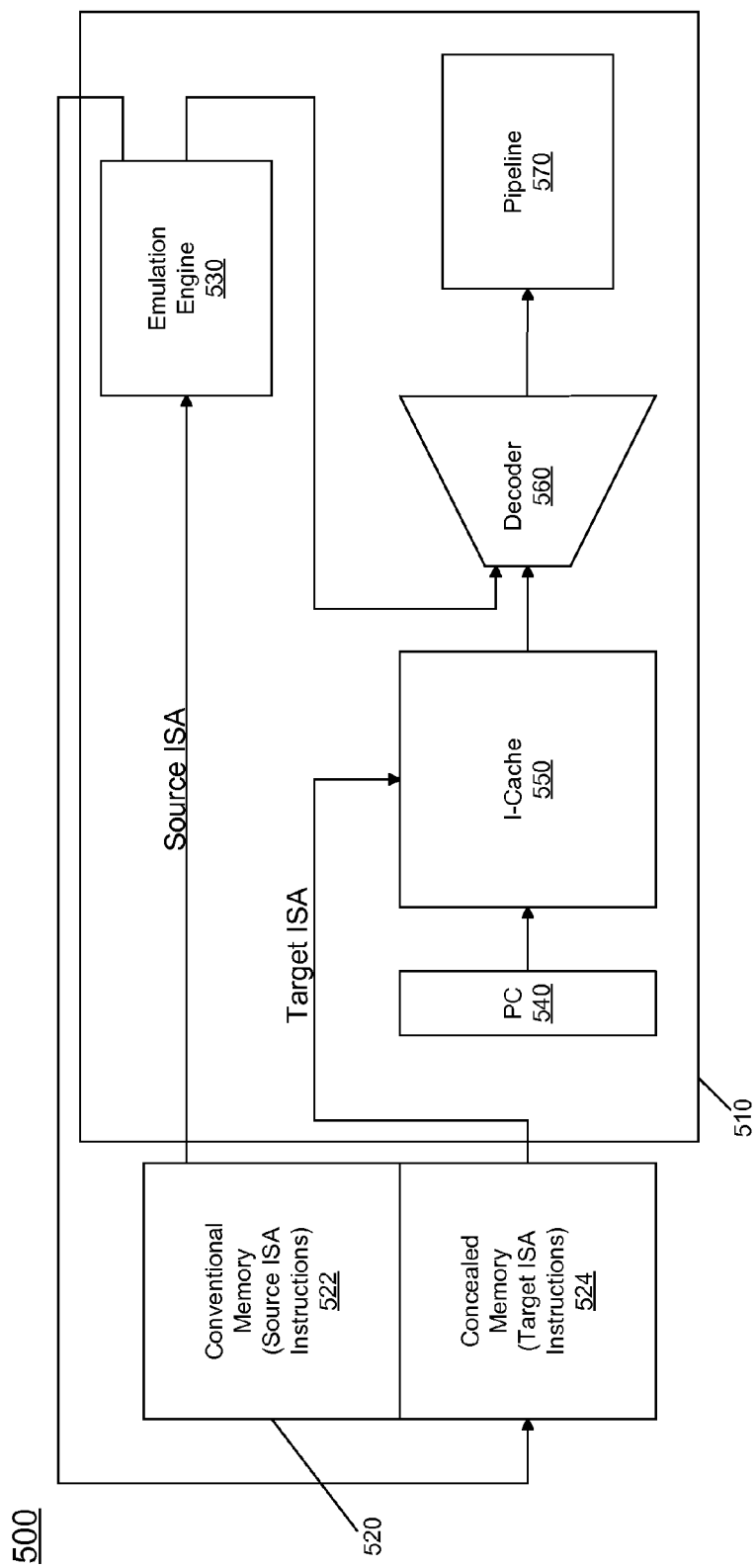
FIG. 5 is a block diagram of a processor in accordance with another embodiment of the present invention.

Referring now to FIG. 5, shown is a block diagram of a processor in accordance with another embodiment of the present invention. As seen in FIG. 5, system 500 includes a processor 510 and a memory 520. Memory 520 includes conventional memory 522, which holds both system and application software, and concealed memory 524, which holds software instrumented for the target ISA. As seen, processor 510 includes an emulation engine 530 which converts source code into target code. Emulation may be done with either interpretation or binary translation. Interpretation is often used for code when it is first encountered. Then, as frequently executed code regions (e.g., hotspots) are discovered through dynamic profiling, they are translated to the target ISA and stored in a code cache in concealed memory 524. Optimization is done as part of the translation process and code that is very heavily used may later be optimized even further. The translated blocks of code are held in code cache 524 so they can be repeatedly re-used.

Still referring to FIG. 5, processor 510, which may be one core of a multicore processor includes a program counter 540 that provides instruction pointer addresses to an instruction cache (I-cache) 550. As seen, I-cache 550 may further receive target ISA instructions directly from concealed memory portion 524 on a miss to a given instruction address. Accordingly, I-cache 550 may store target ISA instructions which can be provided to a decoder 560 which may be a decoder of the target ISA to receive incoming instructions, which may be at the macro-instruction level and to convert the instructions to micro-instructions for execution within a processor pipeline 570. While the scope of the present invention is not limited in this regard, pipeline 570 may be an out-of-order pipeline including various stages to perform and retire instructions. Various execution units, timers, counters, storage locations and monitors such as described above may be present within pipeline 570 to execute to a processor wait instruction in accordance with an embodiment of the present invention. That is, even in an implementation in which a processor 510 is of a different micro-architecture than a micro-architecture for which a user-level processor wait instruction is provided, the instruction can be executed on the underlying hardware.

Figure 6:
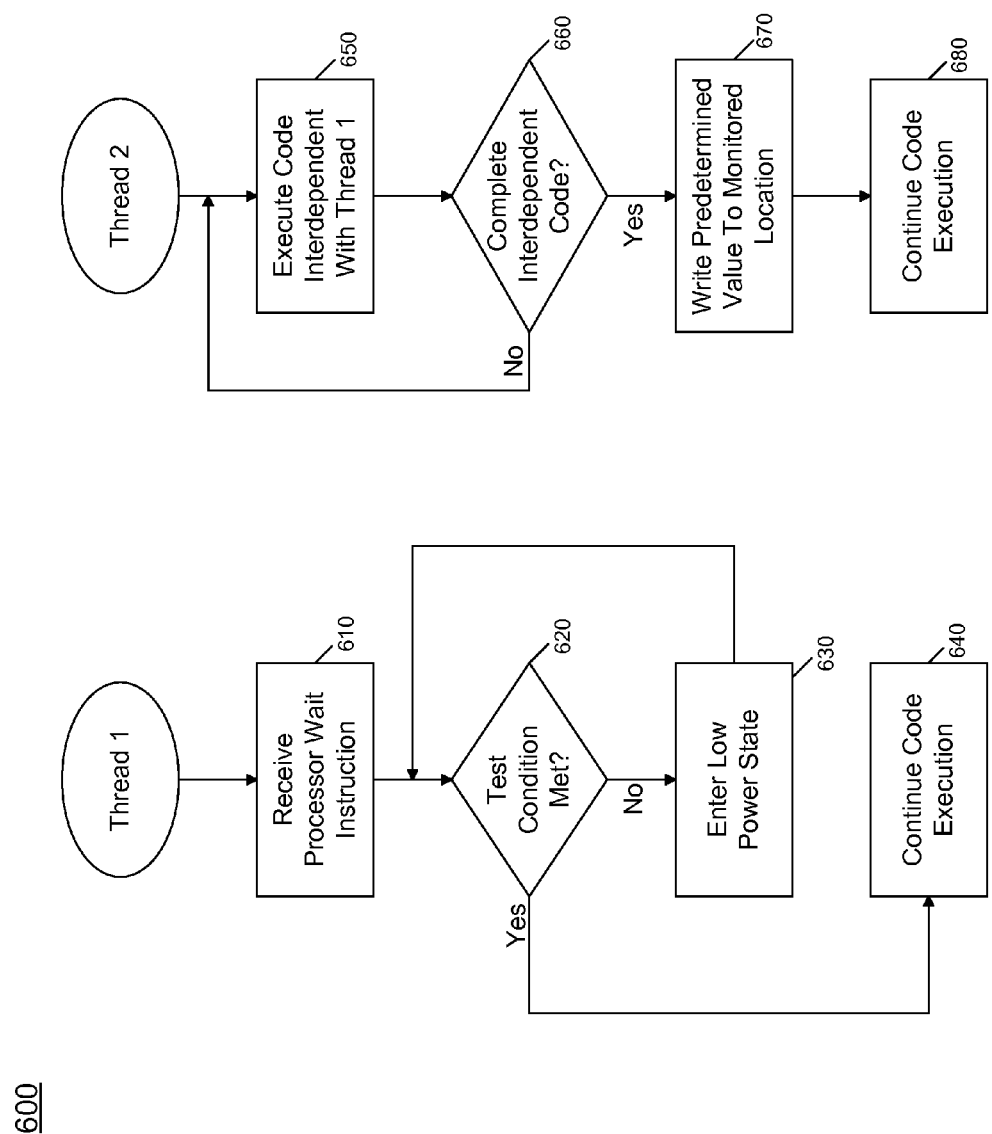
FIG. 6 is a flow diagram of the interaction between cooperative threads in accordance with an embodiment of invention.

Referring now to FIG. 6, shown is a flow diagram of the interaction between cooperative threads in accordance with an embodiment of invention. As shown in FIG. 6, method 600 may be used to execute multiple threads, e.g., in a multi-threaded processor. In the context of FIG. 6, two threads, Thread 1 and Thread 2, are of a single application and may be interdependent such that data to be used by one thread must first be updated by the second thread. Thus as seen, Thread 1 may during its execution receive a processor wait instruction (block 610). During execution of this wait instruction it may be determined whether a test condition has been met (diamond 620). If not, the thread may enter a low power state (block 630). While not shown in FIG. 6, understand that this state can be exited on occurrence of one of various conditions. If instead is determined that the test condition has been met, control passes to block 640 where continued code execution in the first thread may occur. Note that the test condition may be with respect to a monitored location to indicate when an update has successfully been completed by the second thread. Accordingly, before execution of the code shown with respect to Thread 2, the test condition is not met and the processor enters a low power state.

Still referring to FIG. 6, with regard to Thread 2, it may execute code that is interdependent with the first thread (block 650). For example, the second thread may execute code to update one or more values that may be used during execution of the first thread. To ensure that the first thread executes using the updated values, the application may be written such that the first thread enters the low power state until the data is updated by the second thread. Thus during execution of the second thread it may be determined whether it has completed execution of interdependent code (diamond 660). If not, continued execution of interdependent code may occur. If instead this interdependent code section has been completed, control passes to block 670, where a predetermined value may be written to the monitored location (block 670). For example, this predetermined value may correspond to a test value associated with the processor wait instruction. In other embodiments, the predetermined value may be a value such that when masked or when used as a mask with a value in the monitored location, the result is not zero, indicating that the test condition has been met and the first thread can continue execution. Still with reference to Thread 2, after writing this predetermined value, continued code execution of the second thread may occur (block 680). While shown with this particular implementation in the embodiment of FIG. 6, understand the scope of the present invention is not limited in this regard.

Thus embodiments enable a light-weight stalling mechanism that allows a processor to stall waiting one or more predetermined conditions to occur, without the need for OS involvement. In this way, there is no need to have an application poll a semaphore/value to become true in a loop including test, pause, and jump operations, which cause the processor to burn power, and in a hyperthreaded machine prevents other threads from using these cycles. OS monitoring, both in overhead and in scheduling constraints (the waiting application may not be the next thread to be scheduled) can thus be avoided. Accordingly, light-weight communication can occur between cooperative threads and furthermore a processor can flexibly select a sleep state based on time parameters that the user has indicated.

Figure 7:
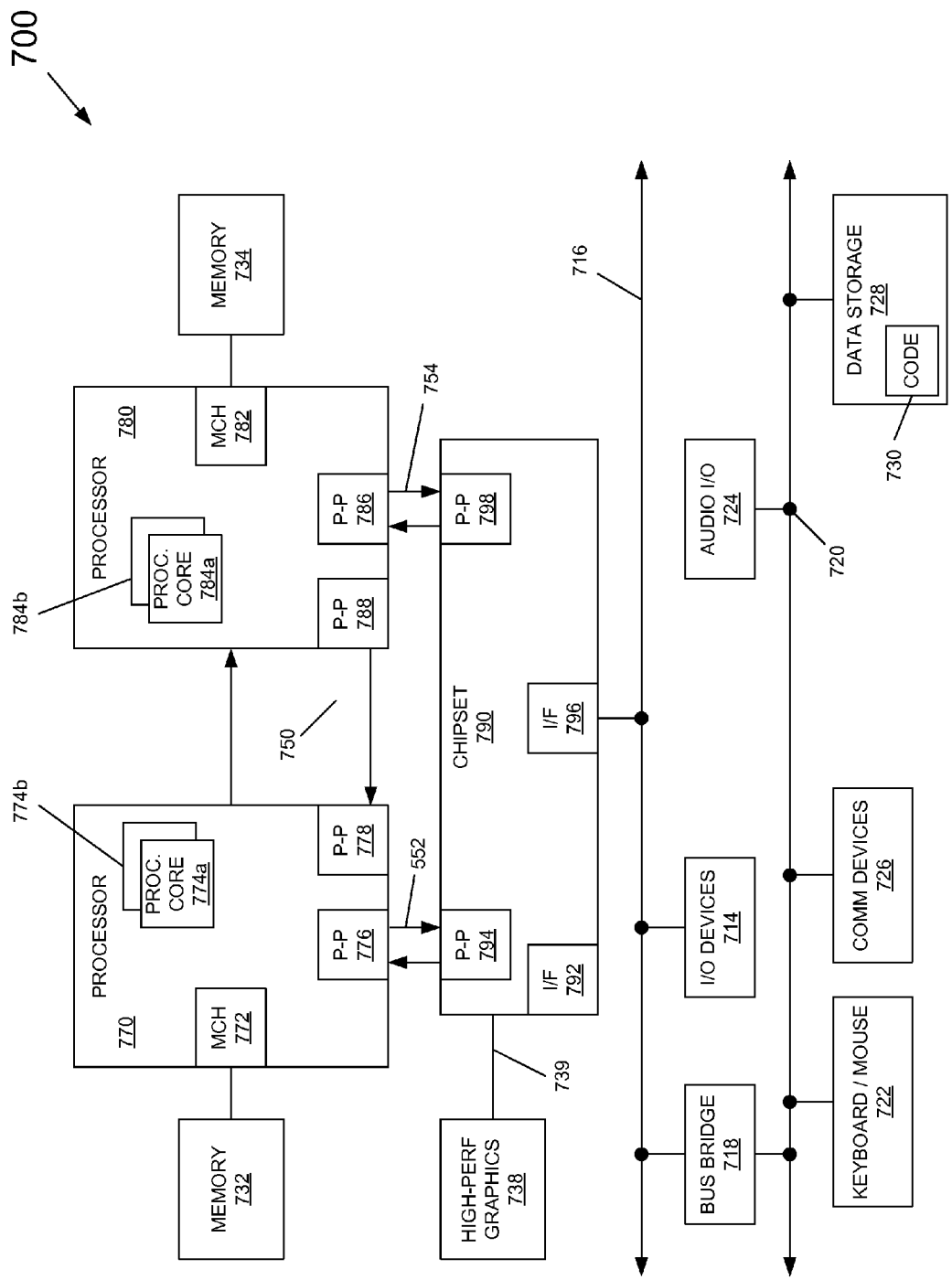
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors. The processor cores may execute various instructions including a user-level processor wait instruction.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of main memory (e.g., a dynamic random access memory (DRAM)) locally attached to the respective processors. First processor 770 and second processor 780 may be coupled to a chipset 790 via P-P interconnects 752 and 754, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a core including a decode logic to receive and decode an instruction from a first application, the instruction prescribing an identification of a location to be monitored and a timer value, and a timer coupled to the decode logic to perform a count with respect to the timer value; and
a power management unit coupled to the core to determine a type of a low power state for the processor based at least in part on the timer value, and to cause the processor to enter the low power state responsive to the determination if a value of the monitored location does not equal a target value and the timer value has not passed, without involvement of an operating system (OS).

2. The processor of claim 1, further comprising a monitor engine coupled to a cache memory to determine if a line of the cache memory including a copy of the monitored location is updated.

3. The processor of claim 2, wherein the monitor engine is to communicate the updated copy and a wake up signal to the core.

4. The processor of claim 3, wherein the core is to determine whether the updated copy corresponds to the target value, and if so to exit the low power state, and otherwise to determine a new low power state and to enter into the new low power state.

5. The processor of claim 1, wherein the instruction is a user-level instruction to cause the processor to load a first value, perform a mask operation between the first value and data stored in a destination location, and to enter the low power state if a result of the mask operation is a first result, otherwise the processor is to load the first value to the destination location.

6. The processor of claim 5, wherein the processor is to set a zero indicator of a flag register if the result equals zero.

7. The processor of claim 1, wherein the timer is to be set to a value corresponding to a difference between a time stamp counter value and the timer value.

8. The processor of claim 1, wherein the processor comprises a multicore processor including the core and a second core, wherein the instruction is of a first thread to execute on the core and a second thread is to update the monitored location.

9. The processor of claim 8, wherein the core is to exit the low power state responsive to the update to the monitored location.

10. The processor of claim 9, wherein the core is to thereafter execute at least one operation of the first thread using data updated by the second thread before the second thread updated the monitored location.

11. A method comprising:
receiving and decoding an instruction from a first application in a processor, the instruction prescribing an identification of a location to be monitored and a timer value;
responsive to the instruction, determining in the processor a type of a low power state for the processor based at least in part on the timer value; and
entering the low power state for the processor responsive to the determination if a value of the monitored location does not equal a target value and the timer value has not passed.

12. The method of claim 11, wherein the instruction further prescribes the target value for the monitored location.

13. The method of claim 11, further comprising exiting the low power state responsive to passing of the timer value.

14. The method of claim 11, further comprising exiting the low power state when a value of the monitored location equals the target value, including receiving a wake up signal from a monitor engine of a cache memory of the processor, the monitor engine to send the wake up signal when a stored value of a cache line including a copy of the monitored location has changed.

15. The method of claim 11, further comprising selecting, using a power management unit (PMU) of the processor, the type of the low power state from a plurality of low power states based on information in a table having a plurality of entries each associating a low power state with a timer value, and sending at least one control signal from the PMU to a core of the processor to cause the core to enter the low power state.

16. The method of claim 11, further comprising receiving a wake up signal from a second processor coupled to the processor and exiting the low power state responsive to the wake up signal.

17. A system comprising:
a multicore processor including a first core and a second core, the first core including a decode logic to decode a user-level instruction to cause a wait state to occur, the user-level instruction prescribing a location to be monitored and a timer value, and a timer coupled to the decode logic to perform a count with respect to the timer value, the multicore processor further including power management logic coupled to the first and second cores to select one of a plurality of low power states based at least in part on the timer value without involvement of an operating system (OS), and to cause the first core to enter the selected low power state responsive to the selection if a value of the monitored location does not equal a target value;
a dynamic random access memory (DRAM) coupled to the multicore processor.

18. The system of claim 17, wherein the first core is to perform a mask operation between a first operand and a second operand responsive to the user-level instruction, and enter the selected low power state if a result of the mask operation is not the target value.

19. The system of claim 18, further comprising a monitor logic coupled to the first core, the monitor logic to cause the first core to exit the low power state responsive to an update to the monitored location.

20. The system of claim 19, wherein the monitor logic is to send a wakeup signal to the first core when a cache line associated with the monitored location has been updated or a coherency state of the cache line has been updated.

21. An article comprising a non-transitory machine-accessible storage medium including instructions that when executed cause a system to:
receive, in a first core of a multicore processor during execution of a first thread, a user-level processor wait instruction that prescribes a location to be monitored and a timer value;
determine in the first core whether a condition of the user-level processor wait instruction has been met, and if not to enter into a low power state selected by a power management logic of the multicore processor;
update a value during execution of a second thread on a second core of the multicore processor;
exit the low power state of the first core and determine whether the condition has been met, responsive to the value update; and
if so, continue execution of the first thread on the first core.

22. The article of claim 21, further comprising instructions that enable the system to cause the first core to exit the low power state responsive to an update to the monitored location and to test for the condition using the value update.

23. The article of claim 22, further comprising instructions that enable the system to determine the update to the monitored location when a cache line associated with the monitored location has been updated or a coherency state of the cache line has been updated, and to cause the first core to exit the low power state responsive to the update to the monitored location.

24. The article of claim 21, further comprising instructions that enable the system to select, using the power management logic, the low power state from a plurality of low power states based on information in a table having a plurality of entries each associating a low power state with a timer value, and send at least one control signal to cause the first core to enter the low power state.

* * * * *